US011414131B2

(12) United States Patent
Chiu (10) Patent No.: US 11,414,131 B2
(45) Date of Patent: Aug. 16, 2022

(54) BLIND SPOT DETECTION DEVICE FOR VEHICLE, METHOD THEREOF, AND STEERING WHEEL DEVICE (71) Applicant: PEGATRON CORPORATION, Taipei (TW)

(72) Inventor: Yu-Hao Chiu, Taipei (TW)

(73) Assignee: PEGATRON CORPORATION, Taipei (TW)

(*) Notice: Subject to any disclaimer, the term of this patent is extended or adjusted under 35 U.S.C. 154(b) by 107 days.

(21) Appl. No.: 17/009,687

(22) Filed: Sep. 1, 2020

(65) Prior Publication Data
US 2021/0101639 A1 Apr. 8, 2021

(30) Foreign Application Priority Data

Oct. 8, 2019 (TW) ................. 108136442

(51) Int. Cl.
B60Q 1/00 (2006.01)
B62D 15/02 (2006.01)
(Continued)

(52) U.S. Cl.
CPC ........... B62D 15/029 (2013.01); B60Q 3/283 (2017.02); B60Q 3/78 (2017.02); B60R 1/00 (2013.01); B60W 30/0953 (2013.01); B60W 40/04 (2013.01); B60W 50/14 (2013.01); B62D 15/021 (2013.01); G06V 20/58 (2022.01);
(Continued)

(58) Field of Classification Search
CPC ...... B62D 15/029; B62D 15/021; B62D 1/04; B60Q 3/283; B60Q 3/78; B60Q 9/008; B60Q 9/00; B60R 1/00; B60R 2300/802; B60W 30/0953; B60W 40/04; B60W 50/14; B60W 2050/143; B60W 2050/146; B60W 2554/801; B60W 2554/803; B60W 2540/18; G06V 20/58; B60K 2370/178;
(Continued)

(56) References Cited

U.S. PATENT DOCUMENTS

2008/0061954 A1* 3/2008 Kulas .................... B60K 37/06
340/461
2014/0210190 A1* 7/2014 Bosch .................. B60R 21/203
280/728.3
(Continued)

FOREIGN PATENT DOCUMENTS

CN 206383880 8/2017

Primary Examiner — Anh V La
(74) Attorney, Agent, or Firm — J.C. Patents (57) ABSTRACT A device for blind spot detection of a vehicle, a method thereof and a steering wheel device are provided. The device includes a steering wheel, a lighting device, a blind spot detector, and a controller. The steering wheel comprises a configuration area including a fixed point, and the fixed point is represented as a virtual location of the vehicle. The lighting device includes a luminous light strip and a dimming driver. The luminous light strip assembled on the steering wheel surrounds the fixed point. The dimming driver controls lamp signals of the luminous light strip. The controller obtains a detection result of whether at least one object is approaching the vehicle, and controls the lamp signals to present a relative position between the vehicle and the at least one object and a degree of proximity between the vehicle and the at least one object according to the lamp signals.

19 Claims, 9 Drawing Sheets (51) Int. Cl.
| | |
|---|---|
| *B60Q 3/283* | (2017.01) |
| *B60Q 3/78* | (2017.01) |
| *B60W 50/14* | (2020.01) |
| *B60W 40/04* | (2006.01) |
| *B60R 1/00* | (2022.01) |
| *B60W 30/095* | (2012.01) |
| *G06V 20/58* | (2022.01) |

(52) U.S. Cl.
CPC .. *B60R 2300/802* (2013.01); *B60W 2050/143* (2013.01); *B60W 2050/146* (2013.01); *B60W 2554/801* (2020.02); *B60W 2554/803* (2020.02)

(58) Field of Classification Search
CPC ........ B60K 2370/179; B60K 2370/338; B60K 35/00; B60K 37/04; B60K 2370/782
USPC .......................... 340/435, 436, 903, 904, 902
See application file for complete search history.

(56) References Cited

U.S. PATENT DOCUMENTS

| | | | |
|---|---|---|---|
| 2019/0001879 A1* | 1/2019 | Ali | B60Q 3/70 |
| 2019/0016383 A1* | 1/2019 | Spencer | B60Q 3/283 |
| 2019/0275935 A1* | 9/2019 | Lisseman | B60Q 3/70 |
| 2019/0315345 A1* | 10/2019 | Newman | B60W 50/14 |
| 2019/0351860 A1* | 11/2019 | Oh | B60Q 3/20 |
| 2020/0062277 A1* | 2/2020 | Kim | G08G 1/166 |
| 2020/0189595 A1* | 6/2020 | Bertollini | G06F 3/016 |

* cited by examiner

BLIND SPOT DETECTION DEVICE FOR VEHICLE, METHOD THEREOF, AND STEERING WHEEL DEVICE

CROSS-REFERENCE TO RELATED APPLICATION

This application claims the priority benefit of Taiwan application serial no. 108136442, filed on Oct. 8, 2019. The entirety of the above-mentioned patent application is hereby incorporated by reference herein and made a part of this specification.

BACKGROUND

Technical Field

The disclosure relates to a blind spot detection (BSD) technique for a vehicle, and particularly relates to a BSD device for a vehicle, a method thereof, and a steering wheel device.

Description of Related Art

When operating a transportation tool (for example, a vehicle), due to obstruction by the vehicle body itself, a viewing angle of driver, etc., a blind area is formed in the driver's visual field, so that the driver cannot surely notice people, things, and objects around the vehicle, and it is easy to cause collision or traffic accidents. Blind spot detection (BSD) technique has been developed to avoid the above situation.

Based on the detection method, the BSD technique may be divided into passive detection (such as adding a small convex mirror to a rear-view mirror) and active detection (such as installing an image recognition device, an ultrasonic/electromagnetic wave sensing device and/or an infrared detection device around the vehicle or at a specific location). In terms of related techniques of prompting the driver, the driver is often prompted by means of "displaying electronic lamp signals on an instrument panel/the rear-view mirror, etc., and/or sending prompt tones", etc. However, regardless of the type of the warning mode, the driver may probably ignore the above warnings due to sounds inside the vehicle, environmental noises, or the driver's visual field, etc. Therefore, a designer of the BSD technique hopes to use diversified warning modes to effectively alert the driver, so as to reduce or even avoid car accidents.

SUMMARY

The disclosure is directed to a blind spot detection device for a vehicle, a method thereof, and a steering wheel device, which use a luminous light strip on a steering wheel to present a relative position relationship and a degree of proximity between the vehicle and objects around the vehicle, to effectively prompt a driver with a detailed configuration direction of the objects around the vehicle, so as to assist the driver to reduce the occurrence of accidents.

An embodiment of the disclosure provides a blind spot detection device for a vehicle including a steering wheel, a lighting device, a blind spot detector, and a controller. The steering wheel comprises a configuration area, the configuration area includes a fixed point, and the fixed point is represented as a virtual location of the vehicle. The lighting device includes a luminous light strip and a dimming driver. The luminous light strip is assembled on the steering wheel and surrounds the fixed point of the configuration area. The dimming driver is coupled to the luminous light strip to control lamp signals of the luminous light strip. The blind spot detector is disposed on the vehicle, the blind spot detector detects whether at least one object is approaching around the vehicle. The controller is coupled to the dimming driver and the blind spot detector. The controller obtains a detection result of whether the at least one object is approaching from the blind spot detector, and controls the lamp signals of the luminous light strip through the dimming driver to present a relative position between the vehicle and the at least one object and a degree of proximity between the vehicle and the at least one object according to the lamp signals of the luminous light strip.

An embodiment of the disclosure provides a steering wheel device including a steering wheel, a lighting device and a controller. The steering wheel comprises a configuration area, the configuration area includes a fixed point, and the fixed point is represented as a virtual location of a vehicle. The lighting device includes a luminous light strip and a dimming driver. The luminous light strip is assembled on the steering wheel and surrounds the fixed point of the configuration area. The dimming driver is coupled to the luminous light strip to control lamp signals of the luminous light strip. The controller is coupled to the dimming driver. The controller controls the lamp signals of the luminous light strip through the dimming driver to present a relative position between the vehicle and at least one object and a degree of proximity between the vehicle and the at least one object according to the lamp signals of the luminous light strip.

An embodiment of the disclosure provides a method for blind spot detection of a vehicle, which includes following steps. It is detected whether at least one object is approaching around the vehicle, wherein a steering wheel of the vehicle is configured with a lighting device, and a luminous light strip of the lighting device is installed on a configuration area of the steering wheel and the luminous light strip surrounds a fixed point of the configuration area, wherein the fixed point of the configuration area is represented as a virtual location of the vehicle. A detection result of whether the at least one object is approaching is obtained, and lamp signals of the luminous light strip are controlled through a dimming driver of the lighting device, so as to present a relative position between the vehicle and the at least one object and a degree of proximity between the vehicle and the at least one object according to the lamp signals of the luminous light strip.

Based on the above description, in the embodiments of the disclosure, the luminous light strip (for example, a light-emitting diode light strip) is provided around a specific area on the steering wheel of the vehicle, and in collaboration with the detection result of whether at least one object is approaching around the vehicle, relative positions between the vehicle and the objects close to the vehicle and degrees of proximity between the vehicle and the objects are presented in real-time by using the luminous light strip. In this way, in the embodiments, the driver learns whether at least one object is approaching around the vehicle according to a position of the lamp signal of the luminous light strip.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DESCRIPTION OF THE EMBODIMENTS

Figure 1:
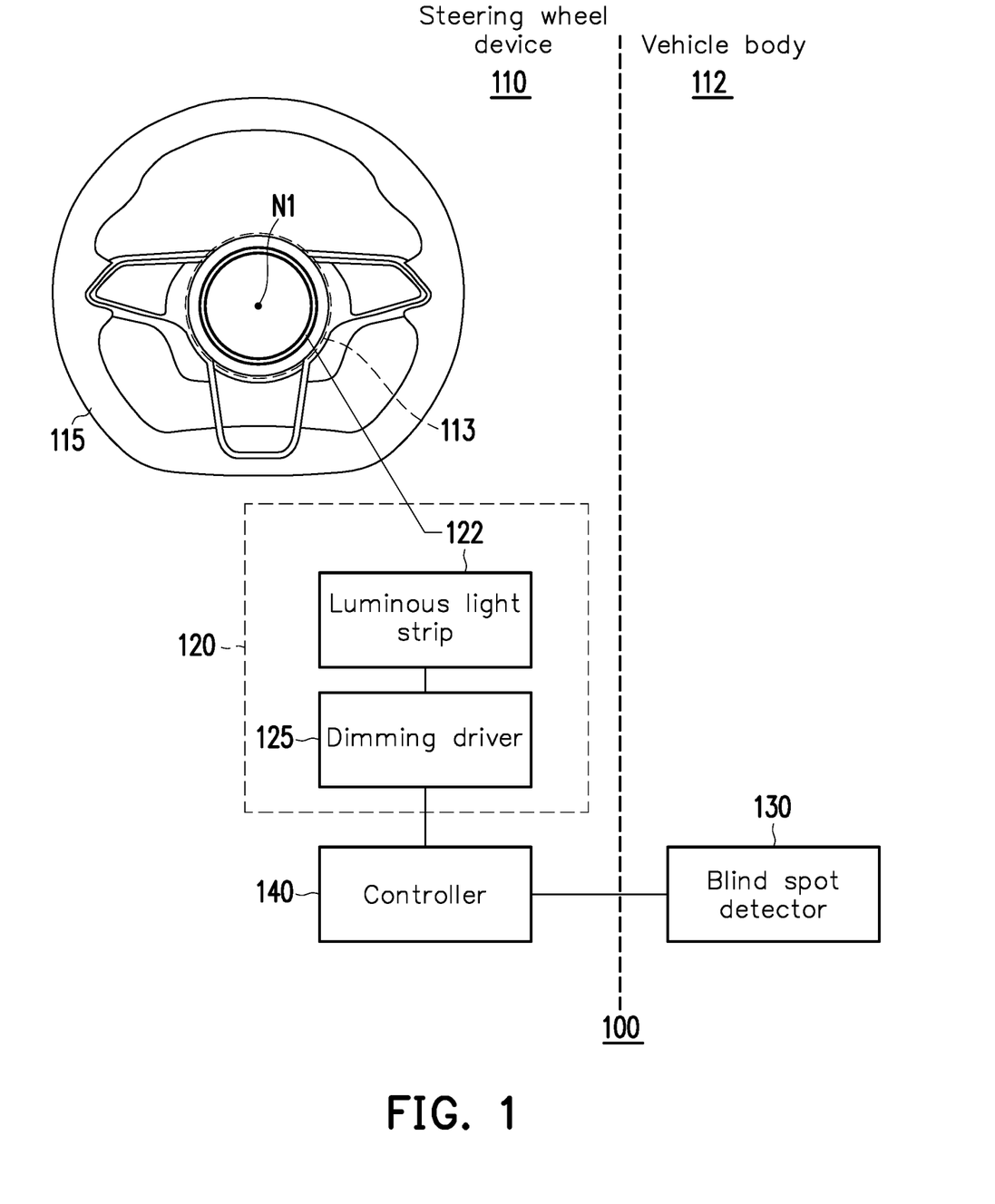
FIG. 1 is a schematic diagram of a blind spot detection (BSD) device 100 for a vehicle according to an embodiment of the disclosure.

FIG. 1 is a schematic diagram of a blind spot detection (BSD) device 100 for a vehicle according to an embodiment of the disclosure. For simplicity's sake, the vehicle of the embodiment is divided into two parts: a steering wheel device 110 and a vehicle body 112. The BSD device 100 includes a steering wheel 115, a lighting device 120, a blind spot detector 130, and a controller 140. The lighting device 120 includes a luminous light strip 122 and a dimming driver 125. According to another aspect, the steering wheel device 110 of the embodiment includes the steering wheel 115 the lighting device 120 and the controller 140, and the vehicle body 112 includes the blind spot detector 130.

Figure 2:
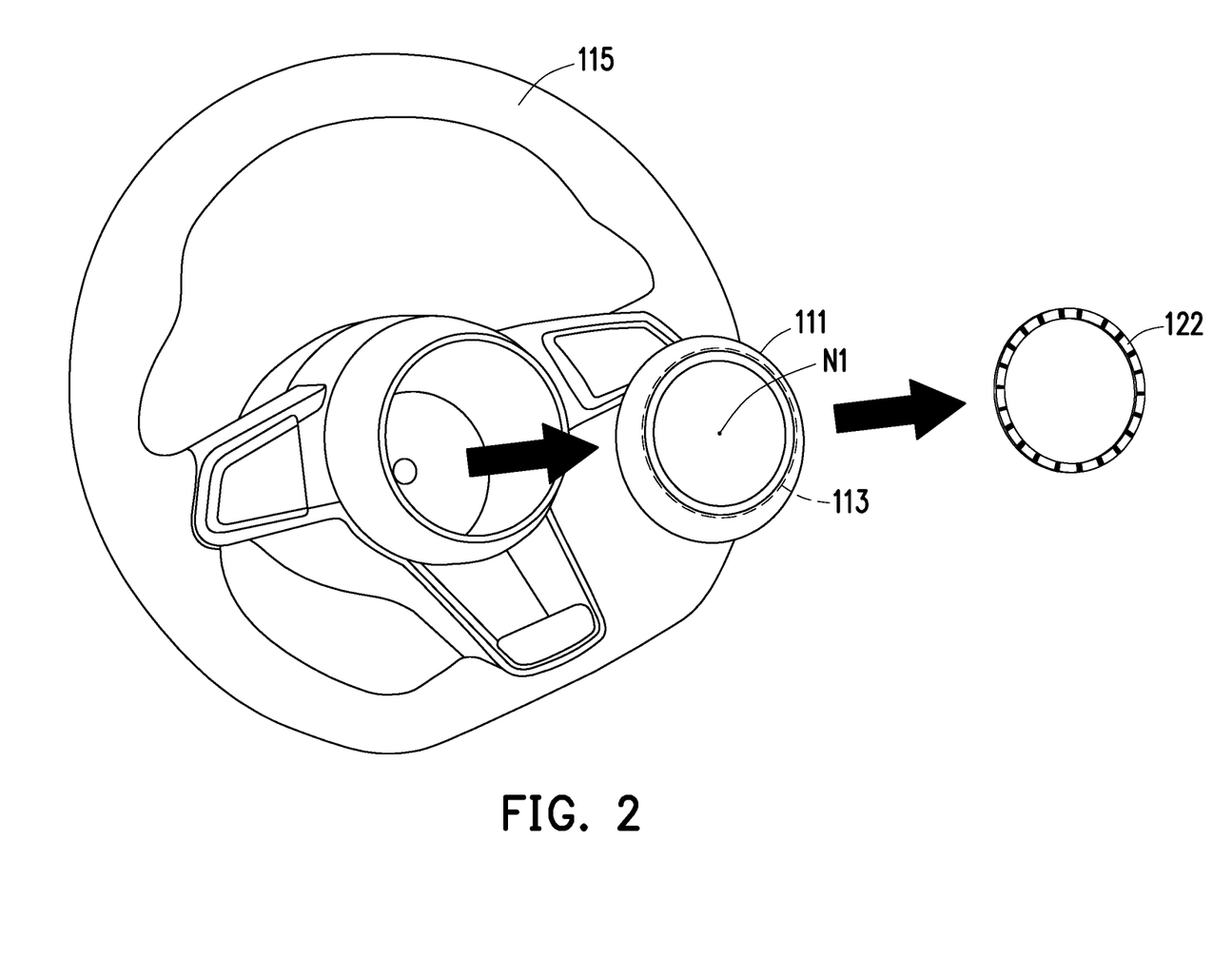
FIG. 2 is a schematic diagram of a steering wheel, a configuration area, an airbag cover and a luminous light strip in a steering wheel device according to an embodiment of the disclosure.

Referring to FIG. 2 for various components in the steering wheel device 110. FIG. 2 is a schematic diagram of the steering wheel 115, a configuration area 113, an airbag cover 111 and a luminous light strip 122 in the steering wheel device 110 according to an embodiment of the disclosure. The steering wheel 115 comprises the configuration area 113, the configuration area 113 includes a fixed point N1, and the fixed point N1 is represented as a virtual location of the vehicle. The configuration area 113 of the embodiment is located on a cover of an airbag provided on the steering wheel device 110, and the cover is the airbag cover 111. The luminous light strip 122 is installed on the configuration area 113 of the steering wheel 115, and the luminous light strip 122 surrounds the fixed point N1 of the configuration area 113, where the fixed point N1 may be a center point of the configuration area 113. The luminous light strip 122 of the embodiment is presented in a ring shape and surrounds the center point N1 of the configuration area 113. Those applying the embodiment may also adopt other closed shapes (for example, a circle/an ellipse/a quadrangle/a polygon, etc.) to surround the fixed point N1 of the configuration area 113, and the shape of the luminous light strip 122 and the position of the fixed point N1 on the steering wheel 115 are not limited by the disclosure. The fixed point N1 of the configuration area 113 is represented as the virtual location of the vehicle. In addition, the dimming driver 125 and the controller 140 in FIG. 1 are disposed inside the steering wheel 115, and those applying the embodiment may arbitrarily adjust the positions of the dimming driver 125 and the controller 140 in the steering wheel 115. The dimming driver 125 and the controller 140 are not shown in FIG. 2.

Referring back to FIG. 1, the dimming driver 125 is coupled to the luminous light strip 122 to control lamp signals of the luminous light strip 122. In detail, the luminous light strip 122 is formed by serially connecting a plurality of light-emitting diodes (LEDs), and the dimming driver 125 may adjust a light color, a light flashing frequency, and/or a luminous brightness of each of the LEDs on the luminous light strip 122. In the embodiment, the dimming driver 125 is controlled by the controller 140, and controls the lamp signals of the luminous light strip 122 according to the adjustment of the controller 140. The so-called lamp signals may be one of or a combination of the light color, the light flashing frequency, and the luminous lightness.

The blind spot detector 130 is disposed on the vehicle body 112, and the blind spot detector 130 is configured to detect whether one or a plurality of objects is approaching around the vehicle. The blind spot detector 130 of the embodiment may adopt a single type of BSD technique, or may be integrated with multiple types of BSD techniques to determine whether there are objects around the vehicle. For example, the blind spot detector 130 may be one of or a combination of a radar rangefinder, an image capturing device, an ultrasonic sensor, and an electromagnetic wave sensor. Different types of blind spot detector 130 have different installation position on the vehicle body 112, and those applying the embodiment may configure and use the corresponding type of the blind spot detector 130 according to actual needs.

The controller 140 obtains a detection result of whether at least one object is approaching from the blind spot detector 130, and controls the lamp signals of the luminous light strip 122 through the dimming driver 125 to present a relative position between the vehicle and the at least one object and a degree of proximity between the vehicle and the at least one object according to the lamp signals of the luminous light strip 122. The controller 140 may simultaneously present the relative position and the degree of proximity between the vehicle and the at least one object by controlling the lamp signals of the luminous light strip 122. In detail, the controller 140 presents the relative position between the at least one object and the vehicle by lighting at least one presentation position of the lamp signals of the luminous light strip 122. The fixed point N1 of the configuration area 113 is represented as the virtual location of the vehicle, and the at least one presentation position of the lamp signals of the luminous light strip 122 corresponds to a configuration direction of the at least one object relative to the vehicle. Moreover, the controller 140 presents the degree of proximity between the vehicle and the at least one object by adjusting one of or a combination of the light color of the light signals, the light flashing frequency, and the luminous brightness of the luminous light strip 122. In other words, the so-called "degree of proximity" may also be referred to as a degree of urgency of whether the object is about to hit the vehicle, or whether the vehicle is about to hit the object. In the embodiment, the "degree of proximity" (or referred to as "degree of urgency treatment", "critical degree") may be divided into three levels, and a distinguishing method or threshold data between each level may be set according to a need of the designer or data learned through experiments. For example, in case of a first level (the object is just within a sensing range of a BSD sensor and is farther away from the vehicle), the driver is warned by yellow light, a small luminous brightness, or a sound effect with a small volume; in case of a second level (the object is closer to the vehicle but there is still a distance there between), the driver is warned by orange light, moderate luminous brightness, or a sound effect with a middle volume; and in case of a third level (the object is very close to the vehicle), the driver is warned by red light, the largest luminous brightness, or a sound effect with the largest volume.

Figure 3:
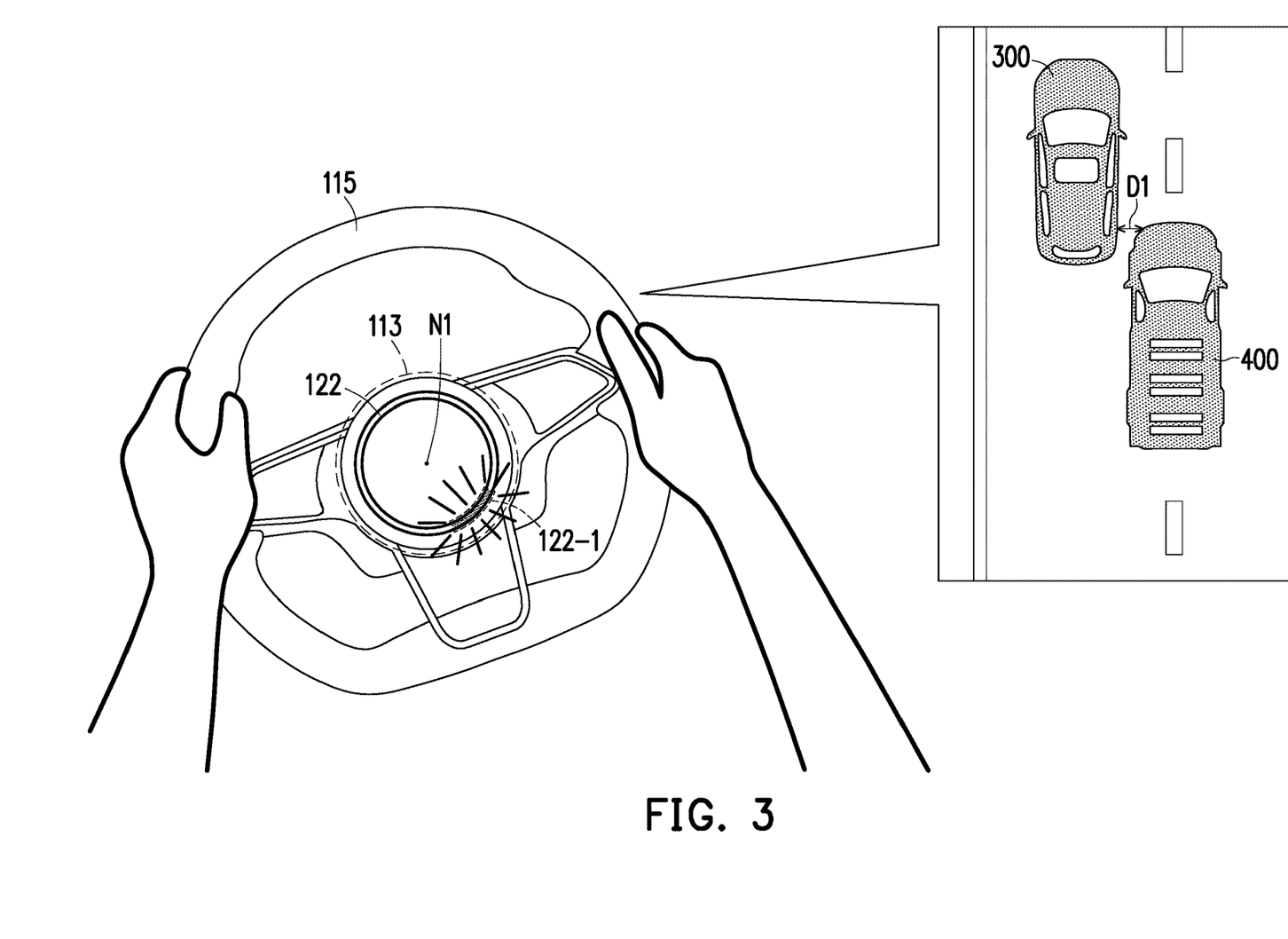
FIG. 3 and FIG. 4 are schematic diagrams of a steering wheel device, a vehicle and closer objects under different situations according to an embodiment of the disclosure.
Figure 4:
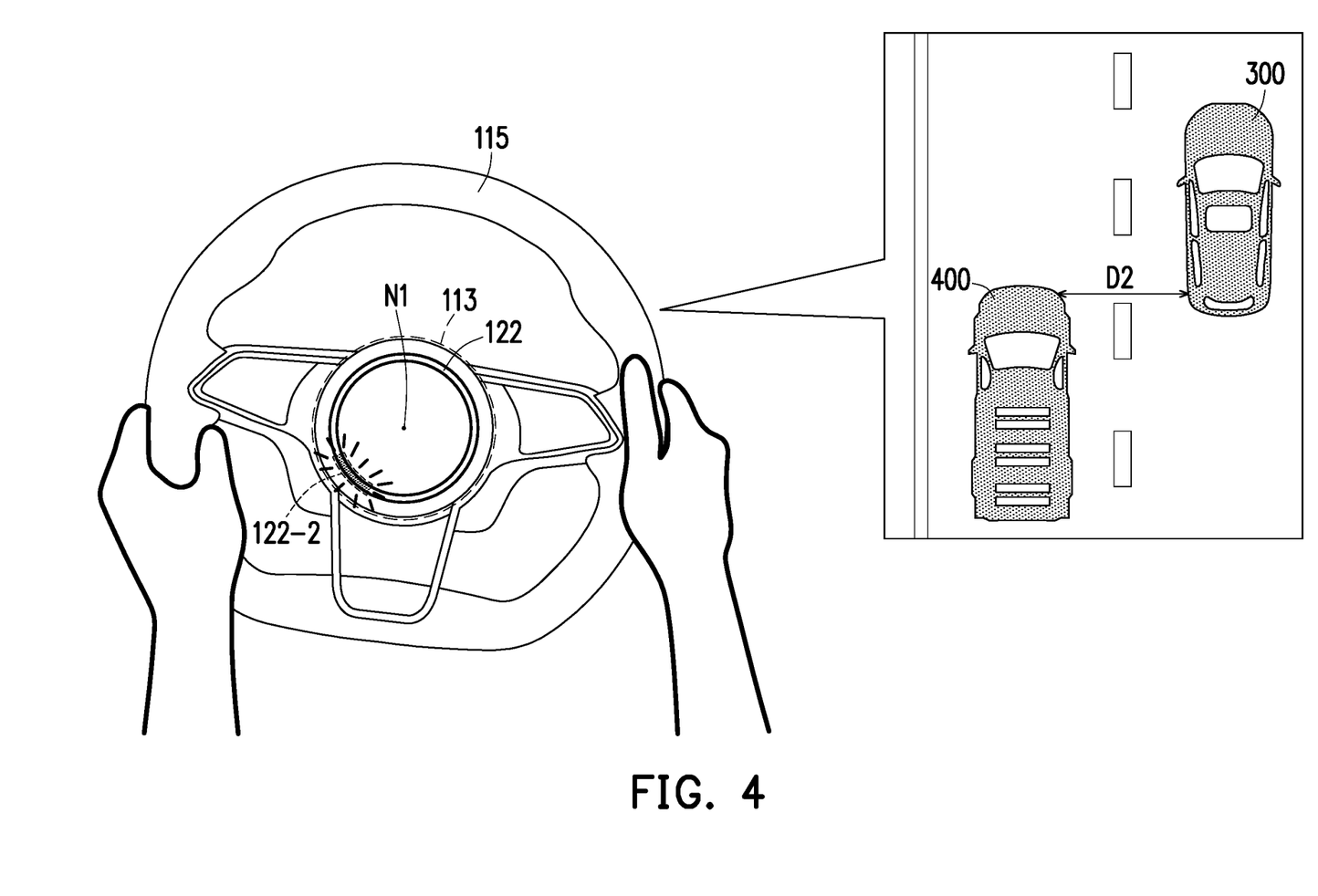

FIG. 3 and FIG. 4 are provided below for further description. FIG. 3 and FIG. 4 are schematic diagrams of the steering wheel device 110, a vehicle and approaching objects under different situations according to an embodiment of the disclosure. Referring to FIG. 3 and FIG. 4, the driver is sitting on a vehicle 300 and holds the steering wheel 115, and an object 400 is exemplified by an approaching vehicle.

Referring to FIG. 1 and FIG. 3, when the vehicle 300 and the object 400 are as shown in a right part of FIG. 3, the blind spot detector 130 on the vehicle 300 detects the object 400 and a distance D1 between the vehicle 300 and the object 400, and provides information such as a relative position of the object 400, the distance D1, etc., to the controller 140. When the controller 140 determines that the distance D1 between the vehicle 300 and the object 400 is very close (for example, at the third level of the aforementioned "degree of urgency"), the controller 140 of FIG. 1 immediately controls the dimming driver 125 to set a lamp signal of an area 122-1 in the luminous light strip 122 to red light, and controls the luminous brightness of the LED in the area 122-1 to be the maximum brightness (or controls the light flashing frequency of the LED in the area 122-1 to be the maximum frequency). Since the fixed point N1 of the configuration area 113 is represented as the virtual location of the vehicle 300, the presentation position (i.e., the area 122-1) of the lamp signal of the luminous light strip 122 is represented as a location of the object 400 relative to the vehicle 300, and the driver may learn that there is the object 400 in the rear that is about to collide with the vehicle 300, such that the driver may perform a corresponding dodging operation.

Referring to FIG. 1 and FIG. 4, when the vehicle 300 and the object 400 are as shown in a right part of FIG. 4, the blind spot detector 130 on the vehicle 300 detects the object 400 and a distance D2 between the vehicle 300 and the object 400, and provides information such as the relative position of the object 400, the distance D2, etc., to the controller 140. When the controller 140 determines that the distance D2 between the vehicle 300 and the object 400 is the second level of the aforementioned "degree of urgency", the controller 140 of FIG. 1 immediately controls the dimming driver 125 to set a lamp signal of an area 122-2 in the luminous light strip 122 to orange light, and controls the luminous brightness of the LED in the area 122-2 to be a moderate luminous brightness (or controls the light flashing frequency of the LED in the area 122-2 to be a moderate frequency). Since the fixed point N1 of the configuration area 113 is represented as the virtual location of the vehicle 300, the presentation position (i.e., the area 122-2) of the lamp signal of the luminous light strip 122 is represented as a location of the object 400 relative to the vehicle 300, and the driver may learn that there is the object 400 in the rear that is relatively close.

Figure 5:
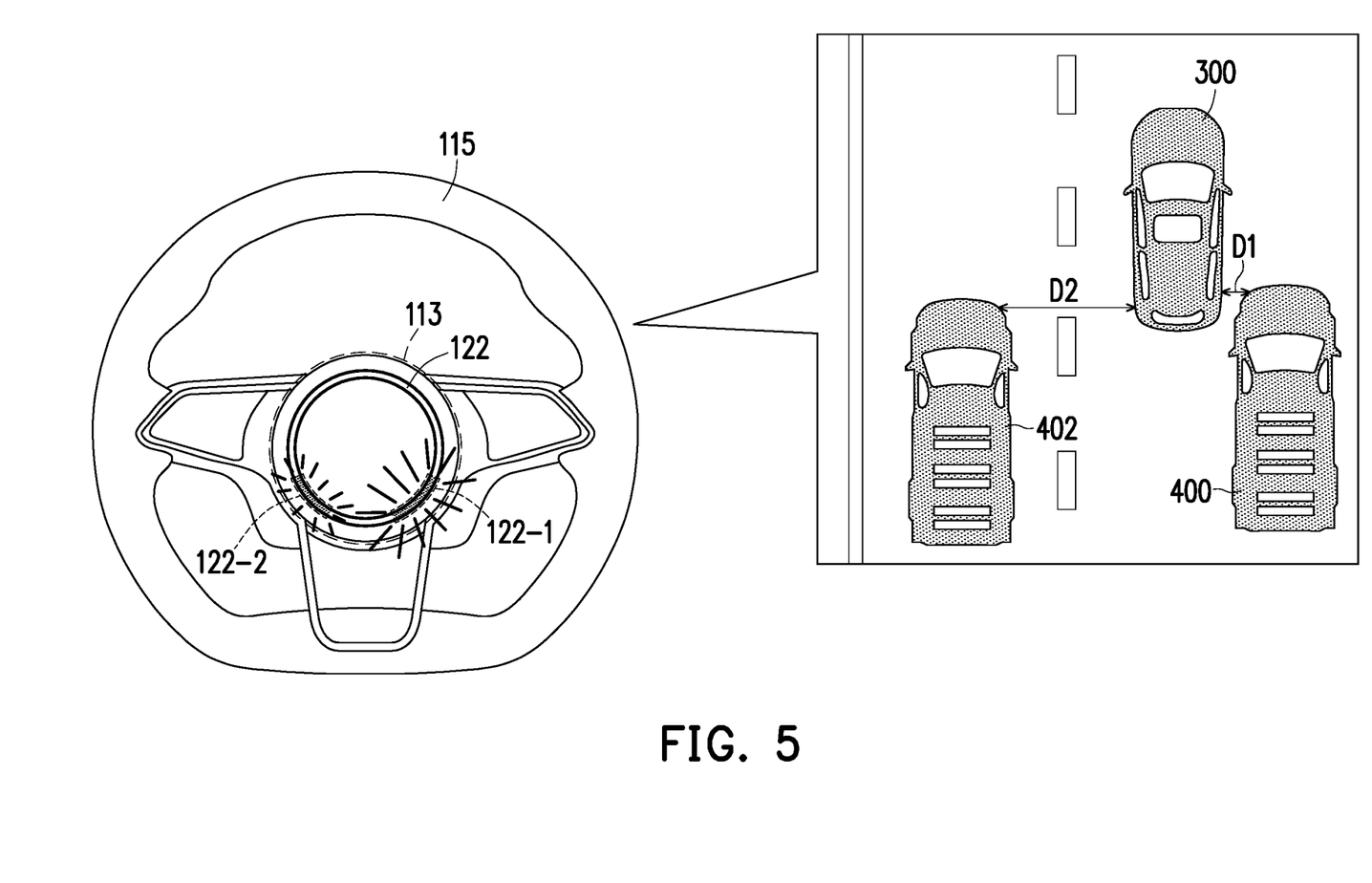
FIG. 5 is a schematic diagram of a steering wheel device and two objects approaching the vehicle according to an embodiment of the disclosure.

FIG. 5 is a schematic diagram of the steering wheel device 110 and two objects 400 and 402 approaching the vehicle 300 according to an embodiment of the disclosure. FIG. 5 mainly shows that the steering wheel device 110 may present a situation that multiple objects are simultaneously approaching the vehicle 300, and the driver may learn that two objects 400 and 402 are approaching the vehicle 300 through the lamp signals on the area 122-1 and the area 122-2 of the luminous light strip 122 on the steering wheel device 110, which may serve as a reference for driving judgment. The lamp signal of the area 122-1 presents the red light and has the maximum luminous brightness (or has the maximum light flashing frequency), which represents that the corresponding object 400 is very close to the vehicle 300. The lamp signal of the area 122-2 presents the orange light and has a moderate luminous brightness (or has a moderate light flashing frequency), which represents that the corresponding object 402 is not so close to the vehicle 300.

Figure 6:
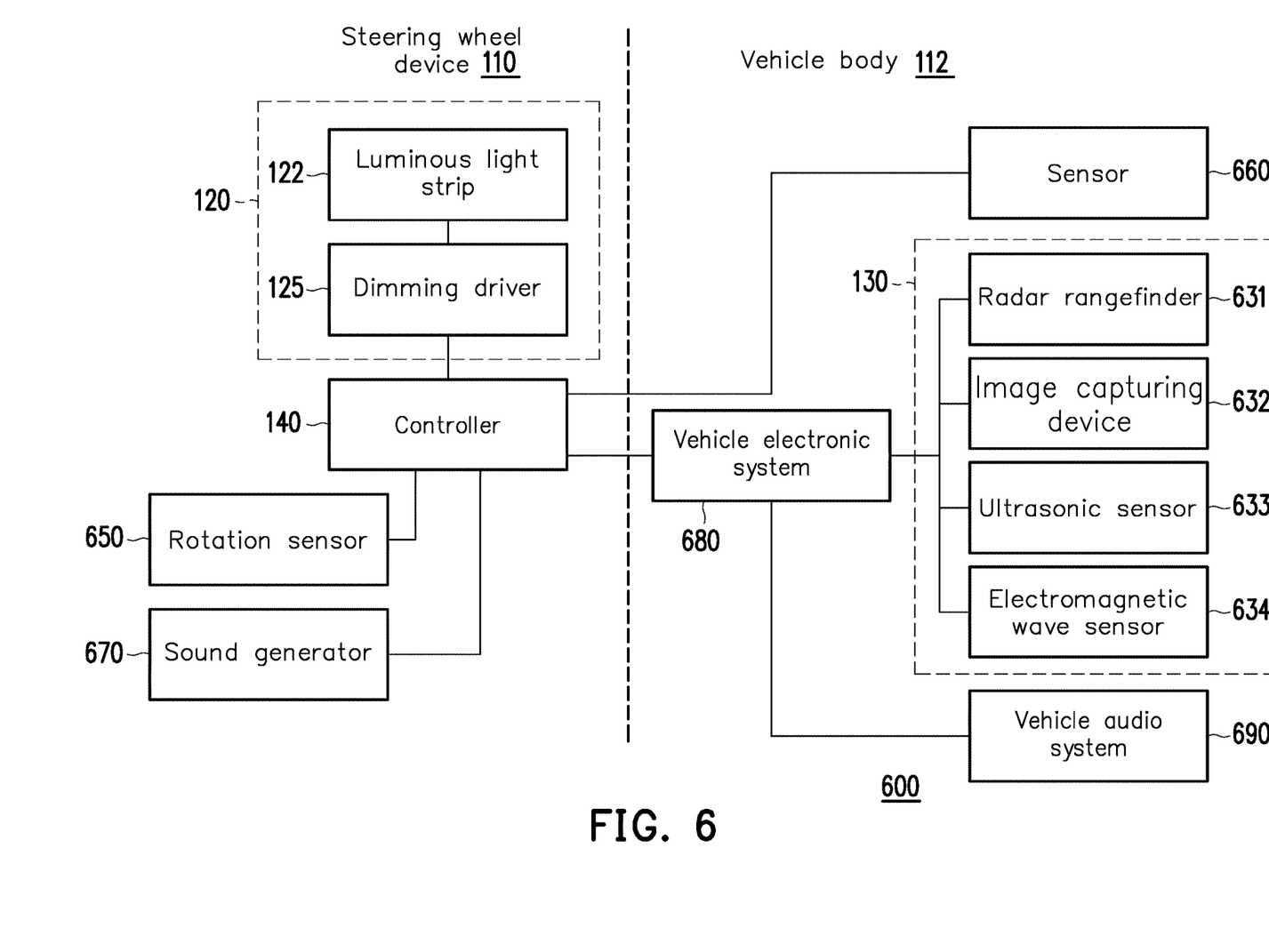
FIG. 6 is a schematic diagram of a BSD device for a vehicle according to another embodiment of the disclosure.

FIG. 6 is a schematic diagram of a BSD device 600 for a vehicle according to another embodiment of the disclosure. Compared with FIG. 1, in addition to the lighting device 120, the blind spot detector 130, and the controller 140 provided in FIG. 1, FIG. 6 further includes a rotation sensor 650 and a sound generator 670 on the steering wheel device 110, and further includes a sensor 660, a vehicle electronic system 680, and a vehicle audio system 690 located on the vehicle body 112. The vehicle electronic system 680 mentioned in the embodiment is an integrated vehicle electronic device and integrated control module provided by the vehicle itself, and the vehicle electronic system 680 is configured to control the blind spot detector 130 and the vehicle audio system 690. The controller 140 may control the sound generator 670 located on the steering wheel device 110 to generate a sound effect, or may communicate with the vehicle electronic system 680 to control the vehicle audio system 690 to generate the sound effect. The vehicle electronic system 680 may provide the controller 140 with a detection result of whether at least one object is approaching. In other words, the steering wheel device 110 of the embodiment is adapted to communicate with the vehicle electronic system 680 used by the vehicle, and provides a warning function through the luminous light strip 122 on the steering wheel device 110, such that the driver learns whether an object is approaching the vehicle.

The rotation sensor 650 is disposed on the steering wheel device 110 and is electrically coupled to the controller 140. The rotation sensor 650 is configured to sense a rotation of the steering wheel device 110 to generate a rotation detection result, and provides the rotation detection result to the controller 140. The controller 140 obtains the rotation detection result from the rotation sensor 650, and adjusts a presentation position of the lamp signal of the luminous light strip 122 according to the rotation detection result, so that a configuration direction of at least one object relative to the vehicle corresponds to the presentation position of the lamp signal of the luminous light strip 122, and is not changed along with the rotation of the steering wheel device 110. The rotation sensor 650 may be implemented by one of or a combination of a three-axis gyroscope, a spirit level, a gravity sensor, and a steering wheel gear rotation sensor. Those applying the embodiment may design the rotation sensor 650 and the controller 140 according to actual needs, as long as presentation of the relative position between the at least one object and the vehicle on the luminous light strip 122 is not changed along with rotation of the steering wheel.

Figure 7:
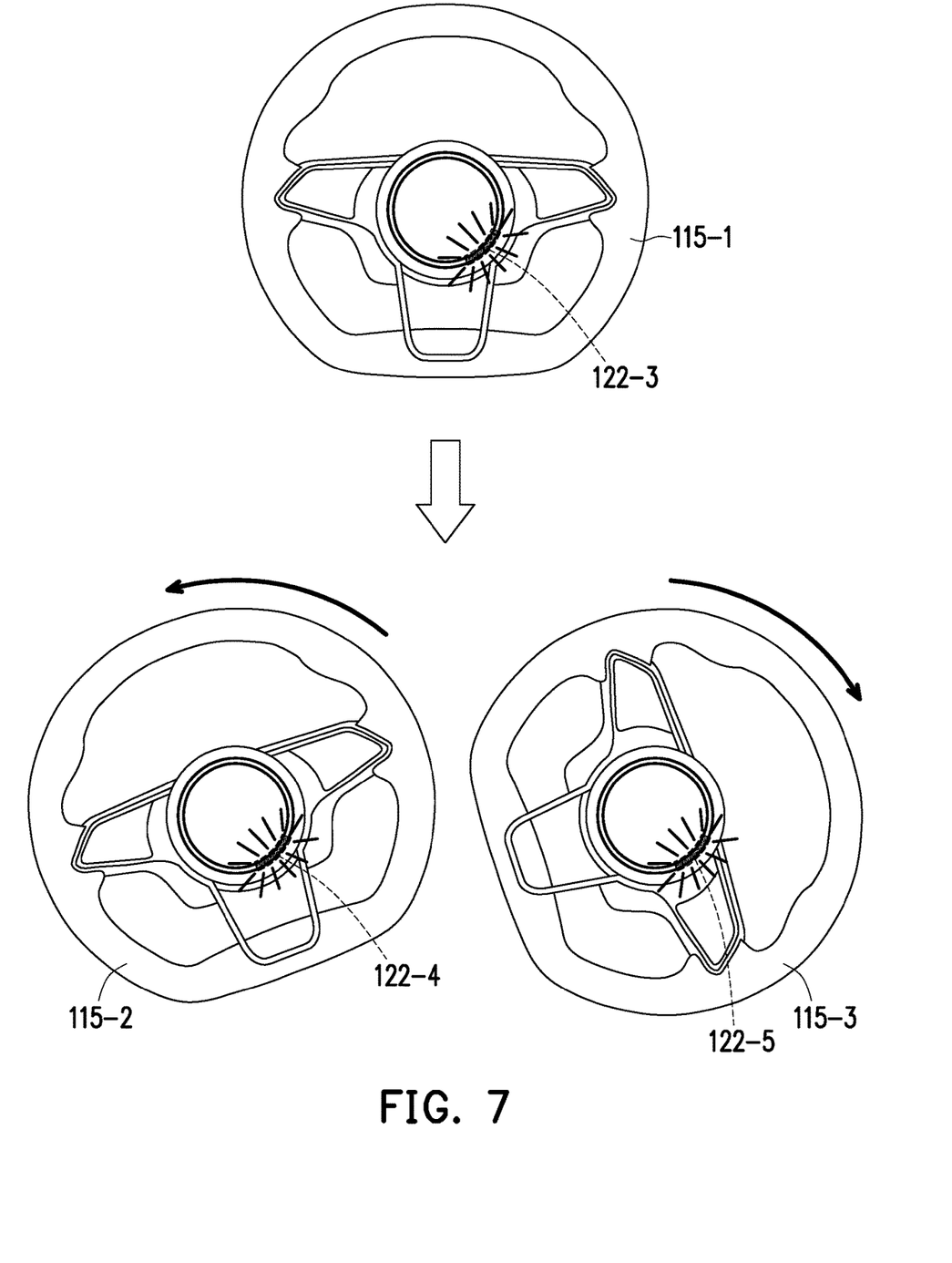
FIG. 7 is a schematic diagram of a luminous light strip when a steering wheel device is rotated according to another embodiment of the disclosure.

FIG. 7 is a schematic diagram of a luminous light strip when the steering wheel device 110 is rotated according to another embodiment of the disclosure. As shown in FIG. 7, from a driver's point of view, an area 122-3 in the luminous light strip 122 of a steering wheel 115-1 that is not rotated (located at a top part of FIG. 7), an area 122-4 in the luminous light strip 122 of a steering wheel 115-2 that is rotated counterclockwise (located at a lower left part of FIG. 7), and an area 122-5 in the luminous light strip 122 of a steering wheel 115-3 that is rotated clockwise (located at a lower right part of FIG. 7) are all present at lower right corners of the steering wheels 115-1, 155-2, and 155-3. Namely, from the driver's point of view, the presentation of the relative position of the at least one object and the vehicle (i.e., the areas 122-3, 122-4, and 122-5) is not changed along with the rotation of the steering wheel device 110.

Referring back to FIG. 6, the BSD device 600 further includes the sensor 660 located on the vehicle body 112. The sensor 660 may be one of or a combination of a radar rangefinder, and a LiDAR (Light Detection and Ranging). The sensor 660 is disposed on the vehicle body 112 and electrically coupled to the controller 140. The sensor 660 is configured to sense an acceleration magnitude and an acceleration direction of at least one object. The controller 140 obtains the acceleration magnitude and the acceleration direction from the sensor 660 to determine a distance between the at least one object and the vehicle and determine whether it is possible to have a collision, and analyzes a degree of urgency of the at least one object relative to the vehicle according to the distance and a collision calculation result, and provides a warning message or performs a control operation according to the degree of urgency. When the warning message is sent, which represents that there is a high probability of collision or contact between the object and the vehicle, at this time, the warning message may be provided in a more drastic way to warn the driver, for example, the lamp signal of the luminous light strip is adjusted to a specific lamp signal (for example, the luminous light strip is full of red light), a specific sound effect is emitted through the sound generator 670 or the vehicle audio system 690, or a moving direction of the vehicle is directly controlled by the vehicle electronic system 680 to perform control operations such as braking or a corresponding automatic dodging operation to avoid colliding with the object. The controller 140 may also adjust one of or a combination of a light color of the lamp signal, a flashing frequency, and a luminous brightness of the luminous light strip 122 to serve as the warning message, so as to present the degree of proximity between the vehicle body 112 and the object, the acceleration magnitude or the degree of urgency of the object relative to the vehicle body 112.

Figure 8:
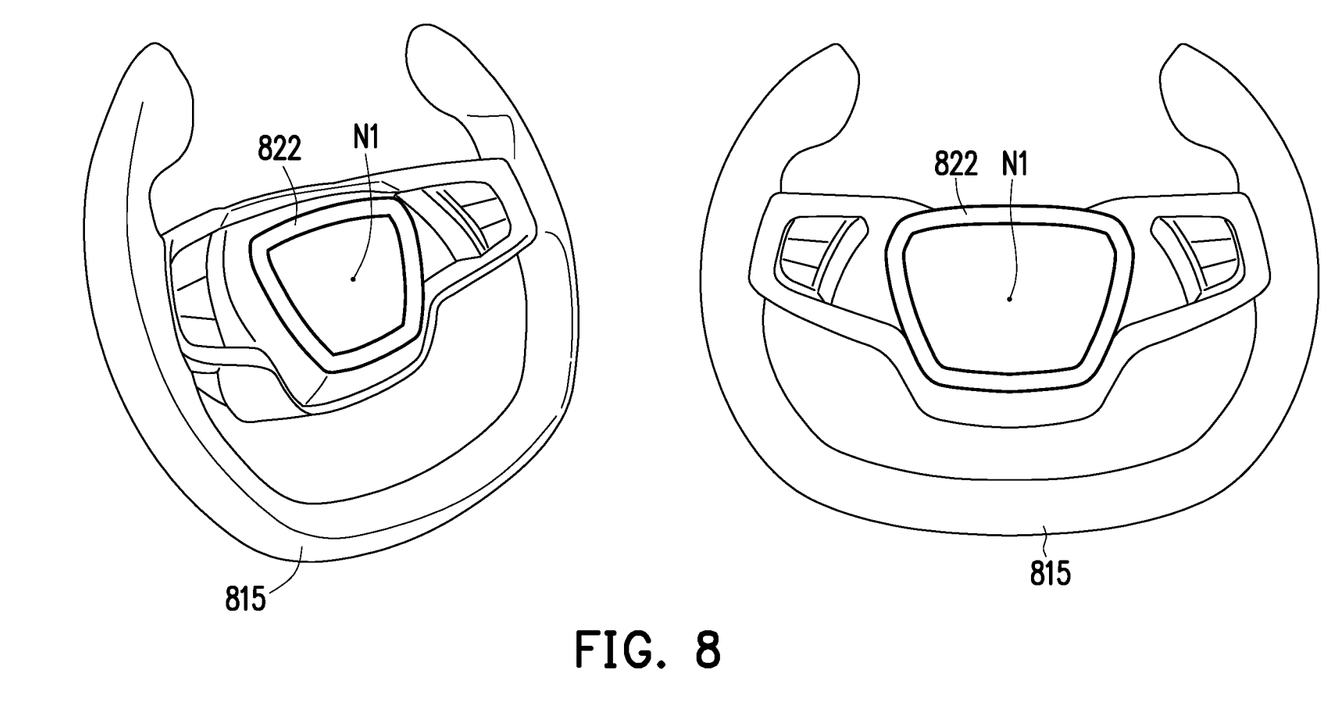
FIG. 8 is a schematic diagram of another structural implementation of a steering wheel and a luminous light strip in a steering wheel device according to an embodiment of the disclosure.

The blind spot detector 130 in FIG. 6 may be one of or a combination of a radar rangefinder 631, an image capturing device 632, an ultrasonic sensor 633, and an electromagnetic wave sensor 634. The vehicle electronic system 680 or the controller 140 may also determine whether the approaching object is a specific vehicle type, for example, a special emergency vehicle such as a fire truck, an ambulance, a police car, etc., through an image captured by the image capturing device 632, so as to provide a warning message to remind the driver to control the vehicle to give way, FIG. 8 is a schematic diagram of another structural implementation of a steering wheel 815 and a luminous light strip 822 in the steering wheel device 110 according to an embodiment of the disclosure. Shapes of the steering wheel 815 and the luminous light strip 822 in the steering wheel device 110 may be adjusted according to actual needs, the luminous light strip 822 needs to be installed around the fixed point N1 in the configuration area and surround the fixed point N1, so as to achieve the technical solution described in the embodiments of the disclosure.

Figure 9:
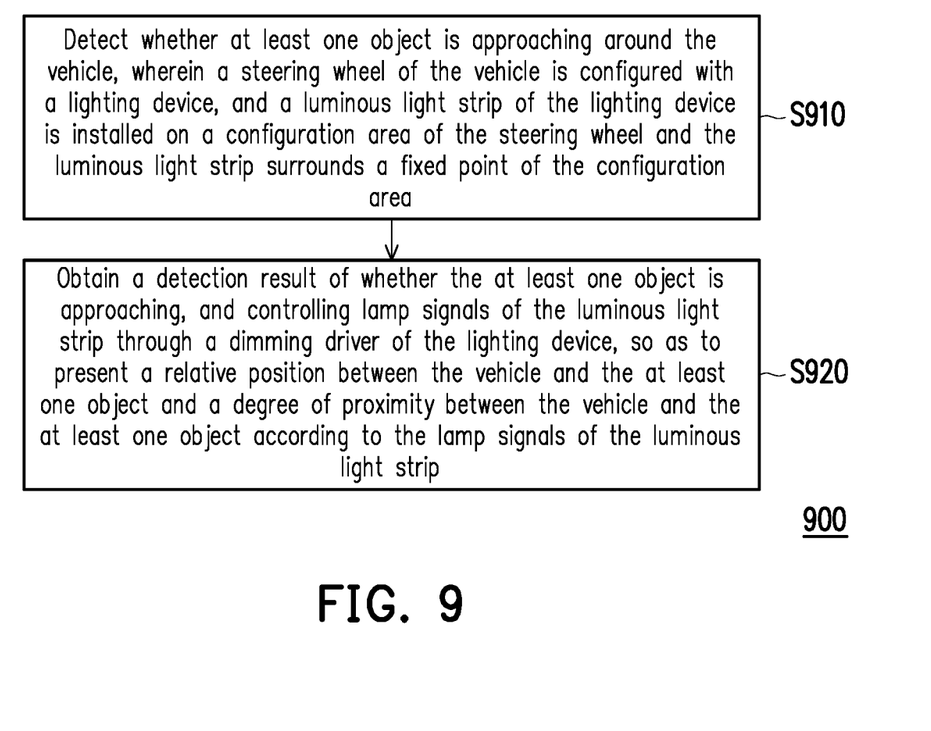
FIG. 9 is a flowchart illustrating a method for blind spot detection of a vehicle according to an embodiment of the disclosure.

FIG. 9 is a flowchart illustrating a method for blind spot detection of a vehicle according to an embodiment of the disclosure. The method for blind spot detection is adapted to the BSD devices 100 and 600 of FIG. 1 to FIG. 8, and may be implemented by the controller 140. The method for blind spot detection 900 includes following steps. In step S910, the controller 140 detects whether at least one object is approaching around the vehicle though the blind spot detector 130 disposed on the vehicle. The steering wheel device 110 of the vehicle is configured with the lighting device 120, and the luminous light strip 122 of the lighting device 120 is installed on the configuration area 113 of the steering wheel device 110 and the luminous light strip 122 surrounds a fixed point of the configuration area 113. In step S920, the controller 140 obtains a detection result of whether the at least one object is approaching from the blind spot detector 130, and controls the lamp signals of the luminous light strip 122 through the dimming driver 125 of the lighting device 120, so as to present a relative position between the vehicle and the at least one object and a degree of proximity between the vehicle and the at least one object according to the lamp signals of the luminous light strip 122. The aforementioned embodiments may be referred for operation details of the method for blind spot detection.

In summary, in the embodiments of the disclosure, the luminous light strip (for example, a light-emitting diode light strip) is provided around a specific area on the steering wheel of the vehicle, and in collaboration with the detection result of the blind spot detector, relative positions between the vehicle and the objects (for example, other vehicles, pedestrians, objects, etc.) close to the vehicle and degrees of proximity between the vehicle and the objects are presented in real-time by using the luminous light strip. In this way, in the embodiments, the driver learns whether at least one object is approaching around the vehicle according to a position of the lamp signal of the luminous light strip, and in collaboration with a color of the lamp signal, a light flashing frequency, and a luminous brightness of the luminous light strip and/or a sound effect, the user learns a degree of proximity between the vehicle and the at least one object around the vehicle. On the other hand, in the embodiment, the rotation sensor is added to the steering wheel, so that the presentation position of the lamp signal on the luminous light strip may be accordingly adjusted along with the rotation of the steering wheel, so as to maintain the relative relationship between the virtual vehicle location and the presentation position of the lamp signal.

What is claimed is:
1. A blind spot detection device for a vehicle, comprising:
a steering wheel comprising a configuration area, wherein the configuration area comprises a fixed point, and the fixed point is represented as a virtual location of the vehicle;
a lighting device comprising a luminous light strip and a dimming driver, wherein the luminous light strip is assembled on the steering wheel and surrounds the fixed point, and the dimming driver is coupled to the luminous light strip to control lamp signals of the luminous light strip;
a blind spot detector disposed on the vehicle and detecting whether at least one object is approaching around the vehicle; and
a controller coupled to the dimming driver and the blind spot detector, wherein the controller obtains a detection result of whether the at least one object is approaching from the blind spot detector, and controls the lamp signals of the luminous light strip through the dimming driver to present a relative position between the vehicle and the at least one object and a degree of proximity between the vehicle and the at least one object according to the lamp signals of the luminous light strip, wherein the blind spot detection device further comprises:

a sensor disposed on the vehicle and electrically coupled to the controller, wherein the sensor senses an acceleration magnitude and an acceleration direction of the at least one object, and the controller obtains the acceleration magnitude and the acceleration direction from the sensor to determine a distance between the at least one object and the vehicle, analyzes a degree of urgency of the at least one object relative to the vehicle according to the distance, and provides a warning message or performs a control operation according to the degree of urgency, wherein when the blind spot detector is an image capturing device, the controller determines whether the at least one object is one of a plurality of emergency vehicle types through an image captured by the image capturing device, and provides an emergency warning message according to one of the emergency vehicle types, wherein the emergency warning message corresponds to the emergency vehicle types and is configured to remind a driver of the vehicle to control the vehicle to give way.

2. The blind spot detection device as claimed in claim 1, further comprising:

a rotation sensor disposed on the steering wheel and electrically coupled to the controller, wherein the rotation sensor senses a rotation of the steering wheel to generate a rotation detection result, and provides the rotation detection result to the controller, and the controller obtains the rotation detection result from the rotation sensor, and adjusts a presentation position of the lamp signals of the luminous light strip according to the rotation detection result, so that a configuration direction of the at least one object relative to the vehicle corresponds to the presentation position of the lamp signals of the luminous light strip.

3. The blind spot detection device as claimed in claim 2, wherein the rotation sensor is one of or a combination of a three-axis gyroscope, a spirit level, a gravity sensor, and a steering wheel gear rotation sensor.

4. The blind spot detection device as claimed in claim 1, wherein the controller presents the relative position between the vehicle and the at least one object by lighting at least one presentation position of the lamp signals of the luminous light strip, and the at least one presentation position of the lamp signals of the luminous light strip is respectively represented as a position of the at least one object relative to the vehicle.

5. The blind spot detection device as claimed in claim 1, wherein the configuration area is located on a cover of an airbag disposed on the steering wheel, and the fixed point of the configuration area is a center point of the configuration area.

6. The blind spot detection device as claimed in claim 1, wherein the controller adjusts one of or a combination of a color, a flashing frequency, and a luminous brightness of the lamp signals of the luminous light strip to serve as the warning message, so as to present the degree of proximity between the vehicle and the at least one object, the acceleration magnitude or the degree of urgency of the at least one object relative to the vehicle.

7. A steering wheel device comprising:

a steering wheel comprising a configuration area, wherein the configuration area comprises a fixed point, and the fixed point is represented as a virtual location of a vehicle of the steering wheel device;

a lighting device comprising a luminous light strip and a dimming driver, wherein the luminous light strip is assembled on the configuration area and surrounds the fixed point, and the dimming driver is coupled to the luminous light strip to control lamp signals of the luminous light strip; and a controller coupled to the dimming driver, wherein the controller controls the lamp signals of the luminous light strip through the dimming driver to present a relative position between the vehicle and at least one object and a degree of proximity between the vehicle and the at least one object according to the lamp signals of the luminous light strip, wherein the vehicle further comprises:

a sensor electrically coupled to the controller, and sensing an acceleration magnitude and an acceleration direction of the at least one object, wherein the controller obtains the acceleration magnitude and the acceleration direction from the sensor to determine a distance between the at least one object and the vehicle, analyzes a degree of urgency of the at least one object relative to the vehicle according to the distance, and provides a warning message or performs a control operation according to the degree of urgency, wherein when a blind spot detector is an image capturing device, the controller determines whether the at least one object is one of a plurality of emergency vehicle types through an image captured by the image capturing device, and provides an emergency warning message according to one of the emergency vehicle types, wherein the emergency warning message corresponds to the emergency vehicle types and is configured to remind a driver of the vehicle to control the vehicle to give way.

8. The steering wheel device as claimed in claim 7, wherein the vehicle comprises:

the blind spot detector disposed on the vehicle, detecting whether the at least one object is around the vehicle approaching, and providing a detection result, wherein the controller determines whether the at least one object is approaching around the vehicle according to the detection result provided by the blind spot detector.

9. The steering wheel device as claimed in claim 7, further comprising:

a rotation sensor disposed on the steering wheel and electrically coupled to the controller, wherein the rotation sensor senses a rotation of the steering wheel to generate a rotation detection result, and provides the rotation detection result to the controller, and the controller obtains the rotation detection result from the rotation sensor, and adjusts a presentation position of the lamp signals of the luminous light strip according to the rotation detection result, so that a configuration direction of the at least one object relative to the vehicle corresponds to the presentation position of the lamp signals of the luminous light strip.

10. The steering wheel device as claimed in claim 9, wherein the rotation sensor is one of or a combination of a three-axis gyroscope, a spirit level, a gravity sensor, and a steering wheel gear rotation sensor.

11. The steering wheel device as claimed in claim 7, wherein the controller presents the relative position between the vehicle and the at least one object by lighting at least one presentation position of the lamp signals of the luminous light strip, and the at least one presentation position of the lamp signals of the luminous light strip is respectively represented as a position of the at least one object relative to the vehicle.

12. The steering wheel device as claimed in claim 7, wherein the configuration area is located on a cover of an airbag disposed on the steering wheel, and the fixed point of the configuration area is a center point of the configuration area.

13. The steering wheel device as claimed in claim 7, wherein the controller adjusts one of or a combination of a color, a flashing frequency, and a luminous brightness of the lamp signals of the luminous light strip to serve as the warning message, so as to present the degree of proximity between the vehicle and the at least one object, the acceleration magnitude or the degree of urgency of the at least one object relative to the vehicle.

14. The steering wheel device as claimed in claim 11, wherein the controller adjusts one of or a combination of a color, a flashing frequency, and a luminous brightness of the lamp signals of the luminous light strip to serve as the warning message, so as to present the degree of proximity between the vehicle and the at least one object, the acceleration magnitude or the degree of urgency of the at least one object relative to the vehicle.

15. A method for blind spot detection of a vehicle, comprising:
    detecting whether at least one object is approaching around the vehicle, wherein a steering wheel of the vehicle is configured with a lighting device, a luminous light strip of the lighting device is installed on a configuration area of the steering wheel and the luminous light strip surrounds a fixed point of the configuration area, and the fixed point of the configuration area is represented as a virtual location of the vehicle; and
    obtaining a detection result of whether the at least one object is approaching, and controlling lamp signals of the luminous light strip through a dimming driver of the lighting device, so as to present a relative position between the vehicle and the at least one object and a degree of proximity between the vehicle and the at least one object according to the lamp signals of the luminous light strip,
    sensing an acceleration magnitude and an acceleration direction of the at least one object;
    determining a distance between the at least one object and the vehicle according to the acceleration magnitude and the acceleration direction, analyzing a degree of urgency of the at least one object relative to the vehicle according to the distance, and providing a warning message or performing a control operation according to the degree of urgency;
    determining whether the at least one object is one of a plurality of emergency vehicle types through an image captured by an image capturing device, and
    providing an emergency warning message according to one of the emergency vehicle types,
    wherein the emergency warning message corresponds to the emergency vehicle types and is configured to remind a driver of the vehicle to control the vehicle to give way.

16. The method for blind spot detection as claimed in claim 15, further comprising:
    sensing a rotation of the steering wheel to generate a rotation detection result; and
    adjusting a presentation position of the lamp signals of the luminous light strip according to the rotation detection result, so that a configuration direction of the at least one object relative to the vehicle corresponds to the presentation position of the lamp signals of the luminous light strip.

17. The method for blind spot detection as claimed in claim 15, wherein the step of presenting the relative position between the vehicle and the at least one object and the degree of proximity between the vehicle and the at least one object according to the lamp signals of the luminous light strip comprises:
    presenting the relative position between the vehicle and the at least one object by lighting at least one presentation position of the lamp signals of the luminous light strip, wherein the at least one presentation position of the lamp signals of the luminous light strip corresponds to a configuration direction of the at least one object relative to the vehicle.

18. The method for blind spot detection as claimed in claim 15, wherein the step of presenting the relative position between the vehicle and the at least one object and the degree of proximity between the vehicle and the at least one object according to the lamp signals of the luminous light strip comprises:
    adjusting one of or a combination of a color, a flashing frequency, and a luminous brightness of the lamp signals of the luminous light strip to present the degree of proximity between the vehicle and the at least one object.

19. The method for blind spot detection as claimed in claim 15, wherein one of or a combination of a color, a flashing frequency, and a luminous brightness of the lamp signals of the luminous light strip is adjusted to serve as the warning message, so as to present the degree of proximity between the vehicle and the at least one object, the acceleration magnitude or the degree of urgency of the at least one object relative to the vehicle.

* * * * *